Figure 3:
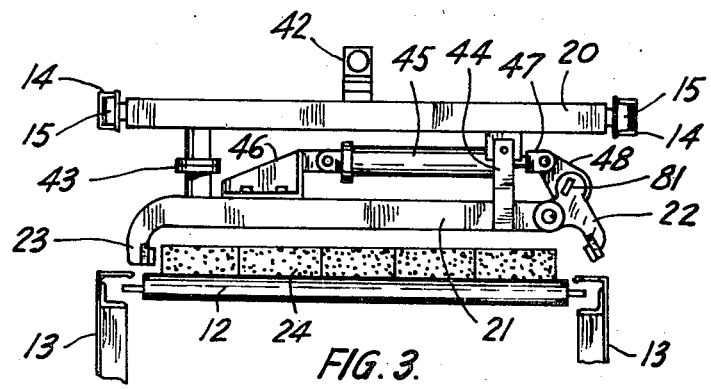

United States Patent
Ransom

[15] 3,687,306
[45] Aug. 29, 1972

[54] UNSTACKING MACHINE
[72] Inventor: Arthur Charles Ransom, Wollongong, Australia
[73] Assignee: Marley Wollongong Limited
[22] Filed: Nov. 4, 1970
[21] Appl. No.: 86,769

[30] Foreign Application Priority Data
July 29, 1970 Australia................18201/70

[52] U.S. Cl..............................................214/8.5 C
[51] Int. Cl.................................................B65g 59/00
[58] Field of Search........214/8.5 C, 8.5 R, 6 A, 1 BB

[56] References Cited
UNITED STATES PATENTS
3,487,959  1/1970  Pearne....................214/8.5 C
3,534,872  10/1970  Roth.......................214/8.5 C Primary Examiner—Gerald M. Forlenza
Assistant Examiner—George F. Abraham
Attorney—Holcombe, Wetherill & Brisebois

[57] ABSTRACT

A machine for handling stacked articles, such as concrete masonry blocks, has two trolleys fitted with gripping attachments. One gripping attachment is used to lift the articles from a stack and deposits them on a conveyor. The other trolley and gripping attachment removes the articles from the conveyor and places them on a second conveyor. From the second conveyor, the articles may be fed to a required destination which, in the case of concrete masonry blocks, may be a splitting machine.

4 Claims, 7 Drawing Figures

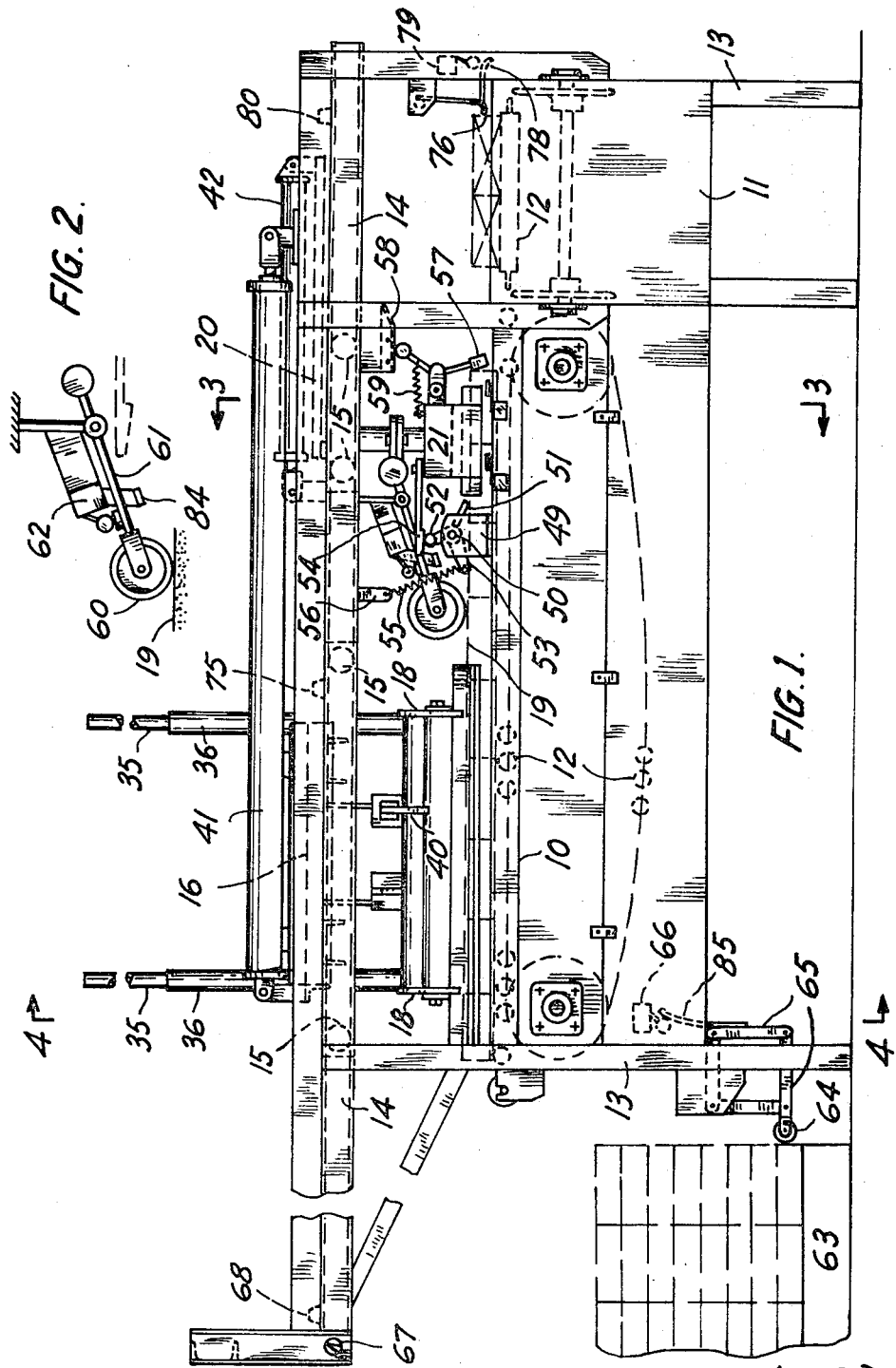

INVENTOR
ARTHUR CHARLES RANSOM
ATTORNEYS

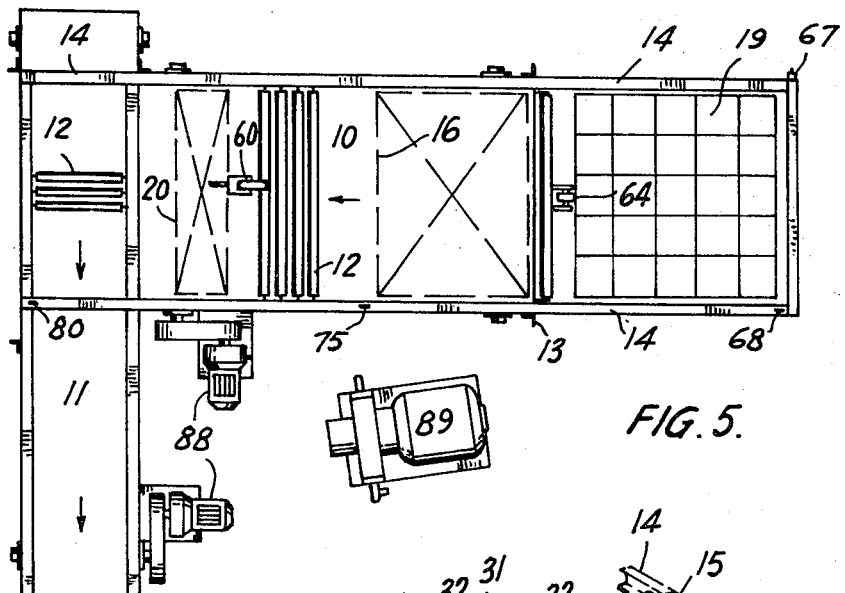
FIG. 5.
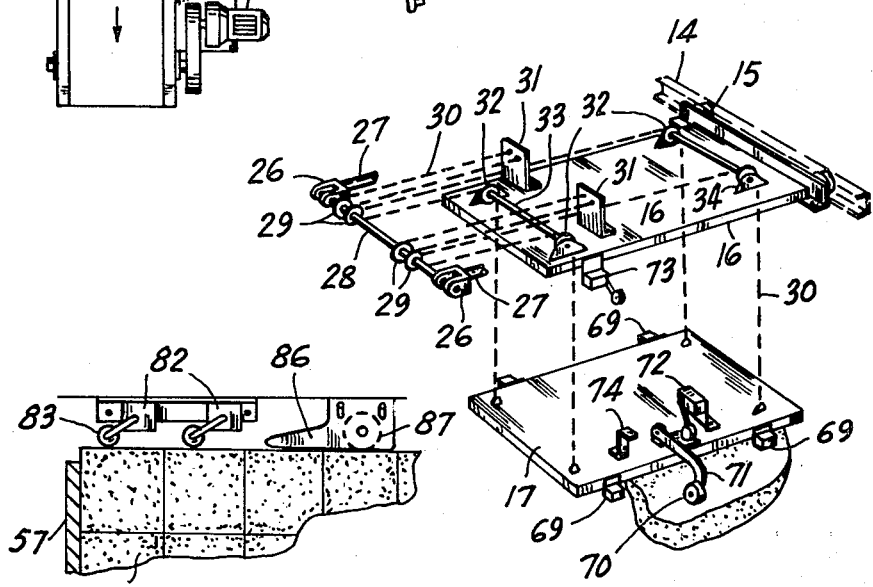
FIG. 7.
FIG. 6.
INVENTOR
ARTHUR CHARLES RANSON
BY Holcombe, Wetherill & Brisebois
ATTORNEYS

UNSTACKING MACHINE

This invention relates generally to automatic machines for handling stacked rows of articles and more particularly relates to an automatic machine for handling concrete masonry blocks from a stack placed on a floor, pallet, or the like, in front of the machine and for feeding such blocks into a splitting machine.

It is an object of the present invention to provide an automatic machine which is capable of lifting a single layer of closely packed rows of masonry blocks from the top of a stack in front of the machine onto a conveyor and then to transfer a selected quantity of these blocks onto a second conveyor for loading into a splitting machine.

The invention according to a general form is a machine for automatically handling a layer of stacked rows of articles or units comprising a frame supporting a conveyor assembly having a first conveyor with front loading and rear delivery positions and a second conveyor mounted on the frame rearwardly of the first conveyor in the same horizontal plane but at right angles thereto, a carriageway supported on the frame above at least the first conveyor and parallel thereto, at least one trolley adapted to reciprocate along the carriageway with a travelling platform attached thereto, said carriageway extending forwardly of the said first conveyor to permit movement of the trolley and travelling platform over the top of stacked structural units, the platform having a clamp assembly suspended therefrom having means for lowering and elevating gripping members adapted to engage and grip the sides of a single layer of stacked rows of units and to lift said layer from said stack onto the front loading position of the first conveyor, the said first conveyor and the trolley being provided with associated trip means for controlling the operation of the conveyor and the reciprocating movement of the trolley in response to loading and unloading movement of the clamp assembly.

Figure 4:
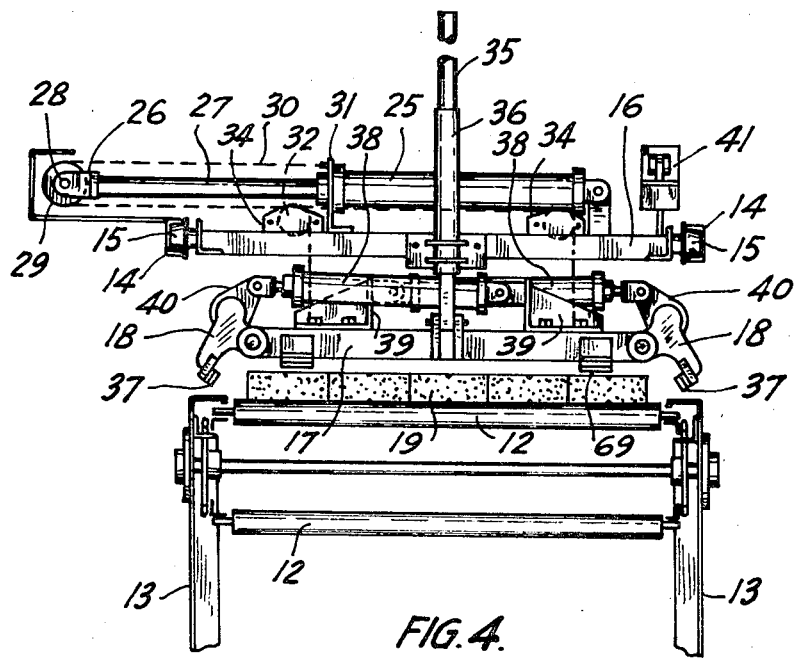

The invention is hereinafter described by way of example with reference to the accompanying drawings in which:

FIG. 1 is a side elevation of a machine showing a stack of concrete masonry blocks contacting a roller at the base of the machine and a line of blocks on both the first and second conveyors, FIG. 2 is a fragmentary view to an enlarged scale of the roller device and its suspension, FIG. 3 is a cross-section taken on the plane 3—3 of FIG. 1, showing a layer of concrete masonry blocks under a first or small gripper bed, FIG. 4 is a cross section taken on plane 4—4 of FIG. 1 showing a layer of concrete masonry blocks under a second or large gripper head placed on the first conveyor, FIG. 5 is a plan view on a reduced scale of FIG. 1 showing the positioning of both conveyors, FIG. 6 is a diagrammatic view showing means for suspending lower gripper platform, various parts being omitted for clarity, and FIG. 7 is a fragmentary plan view to an enlarged scale of means for guiding the edge of concrete masonry blocks under the gripper platform with two limit switches contacting the edges of blocks, and a guard bar retaining the concrete masonry blocks in position.

The machine illustrated includes a conveyor assembly having a first conveyor 10 and a second conveyor 11 mounted rearwardly of the first conveyor and fitted with idler roller attachments 12. The two conveyors are arranged in the same horizontal plane and are at right angles, to each other and are mounted on a structural steel framework 13.

A carriageway is supported on the frame above both conveyor assemblies and is constructed with channel shaped rails 14 carrying a large trolley at the front of the carriageway and a smaller trolley at the rear, both being supported on flanged wheels 15. The large trolley has a travelling platform 16 and the smaller a travelling platform 20. The carriageway extends both forwardly and rearwardly of the first conveyor 10 and the travelling platform 16 of the large trolley is adapted to travel out over the front end of the machine and over the top of a stack masonry blocks for loading the blocks into the splitting machine. The travelling platform 16 has a second platform 17 suspended from it by pulley means (refer to FIG. 3) and the platform 17 has a clamp assembly mounted thereon comprising a pair of opposed moveable pivoted gripper jaws 18 for gripping a single layer of closely packed rows of masonry blocks 19 onto the front or loading end of the first conveyor 10 from a stack of blocks 63. The layer of blocks normally contains rows which are five blocks wide and five blocks long.

The second or smaller rear trolley has a travelling platform 20 with a lower platform 21 fixed to the underside of it. The lower platform 21 is equipped with a clamp assembly having a pivoted moveable gripper 22 on one side and a fixed opposed jaw 23 on the other side, for clamping, lifting and then delivering a single layer of only two rows of blocks 24 from the delivery end of the first or larger conveyor 10 onto the narrower conveyor 11. At the delivery point the layer is only five blocks wide by two blocks long and the narrower conveyor is constructed accordingly.

The travelling platform 16 of the first or large trolley has twin hydraulic cylinders 25 spaced apart and rigidly supported on the lower or clamp assembly platform 17 and having forked ends 26 on each cylinder piston rod 27, connected by a common shaft 28 fitted with twin idler sprocket wheels 29 for a sprocket chain 30 suspending and supporting clamp assembly platform 17 thereby providing pulley means for lowering and elevating the clamp assembly and gripping jaws pivotally mounted on the platform.

Each hydraulic cylinder 25 thus controls the movement of separate lengths of chain 30 one end of each chain being fastened to anchor plates 31 supporting the front end of each hydraulic cylinder 25.

Each chain then passed over twin idler sprocket wheels 29 and single idler sprocket wheels 32 on a cross shaft 33 between bearing sprockets 34 on the top of platform 16 and then downwardly to a point where the other end is fastened to the top surface of the lower or clamp assembly platform 17. The other length of chain passes over a similar idler sprocket wheel on the opposite side of the travelling trolley 16 and then downwards to where it is secured to the suspended clamp platform 17.

This arrangement forms a flexible four point variable suspension for the suspended clamp platform 17 which is capable of being raised and lowered. The movement is constrained by two guide rods 35 on the suspended clamp platform 17 sliding within tubular members 36 secured to front and rear edges of the trolley platform 16. The two moveable grippers 18 pivoted on the sides of the suspended clamp platform 17 have wide joints fitted with rubber strips 37 to prevent damage to the concrete masonry blocks, and are each operated by hydraulic cylinders 38 having one end pivoted on bracket 39 affixed to clamp platform 17. The other or piston rod end fork is pivoted to the gripper lever arm 40. Carriage movement along the guide channels 14 for both the large and small trolleys and associated travelling platform 16 and 20 is controlled by hydraulic cylinders 41 and 42, one end of each being pivoted to the machine framework, the opposite end being pivoted to its corresponding travelling trolley platform.

The rear trolley has a travelling platform 20 with vertically stationary clamp assembly suspended therefrom and secured thereto by a flanged joint 43 on one side and by two links 44 on the other side (see FIG. 3), with a hydraulic cylinder 45 controlling the moveable gripper 22, pivoted at one end to a fixed bracket 46 on lower fixed platform 21 with the piston rod forked end 47 pivoted to the gripper lever arm 48. The moveable gripper 22 forces the row of structural units 24 against the fixed jaw member 23.

Attached to both sides of the wider or front conveyor framework are bracket plates 49 (see FIG. 1) supporting a cross-shaft 50 free to rotate in bearings, said shaft carrying a front guard flap plate 51 actuated by a roller 52 on one end of a bell-cranked lever 53 contacting a cam plate 54 affixed to the small gripper platform 21, the other end of the bell-cranked lever 53 contacting a cam plate 54 affixed to the small gripper platform 21, the other end of the bell-cranked lever 53 having a tension spring 55 attached to a fixed support 56.

The front guard flat plate 51 functions as a stop to prevent the concrete masonry blocks 19 moving along the wide conveyor 10 until the small travelling top platform 16 returns, after discharging, its two rows of concrete masonry blocks on to the narrow conveyor 11 and the cam plate 54 actuates the roller 52 on the bell-cranked lever 53 which lifts the front guard flap plate 51 and allows the concrete masonry blocks to position themselves between the moveable gripper 22 and the fixed jaw 23 attached to the smaller or lower fixed clamp platform 21. Another guard flap or bar 57 is pivoted to the front face of the clamp platform 21 and is actuated by a cam plate 58 affixed to the machine framework and a tension spring 59 attached to the clamp platform 21.

This guard flap or bar 57 functions as a stop to locate two concrete masonry blocks between the pivotally moveable gripper 22 and fixed jaw 23. A rubber tyred wheel 60 mounted on the end of a pivoted counterweighted lever 61 supported from the machine framework (see FIG. 2) rides on the concrete masonry block surface and after the last block passes the rubber tyred wheel 60 drops and causes the lever arm 61 to actuate a limit switch 62 and closes an electrical circuit which operates hydraulic cylinder 41 causing large travelling top platform 16 which carries lower gripper platform 17, to return to the front of machine for engagement with another layer of concrete masonry blocks.

In operation a pallet 63 stacked with concrete masonry blocks is moved into a position against a roller 64 attached to parallel links 65 at the base of the machine which actuates a limit switch 66 closing an electrical circuit. A manual switch 67 is then pressed by the operator and sets the machine in motion causing hydraulic cylinder 41 to move the large travelling top platform 16 which carries the lower clamp platform 17 forward until it is directly above the stack of concrete masonry blocks.

At this point a stop 68 on the tip end of channel rail 14 trips a limit switch on the top platform (not Shown) which causes hydraulic cylinders 25 to simultaneously lower the gripper platform 17 onto the top layer of concrete masonry blocks and engaging same by means of rubber surfaced cleats 69.

A roller 70 on end of a bent lever 71 pivoted on gripper platform 17 (see FIG. 6) contacts the top surface of concrete masonry blocks and causes the bent lever to trip a limit switch 72 attached to the gripper platform 17 causing the hydraulic cylinder 38 (see FIG. 4) to operate and close grippers 18 on the top layer of concrete masonry blocks.

When the grippers 18 close on the opposite edges of the blocks a pressure switch (not shown) allows clamping pressure to build up to a predetermined pressure and then actuates a limit switch (not shown) that causes hydraulic cylinders 25 to elevate the gripper platform 17 with a layer of concrete masonry blocks to the level of the wide conveyor roller surface. At this point a limit switch 73 on top platform 20 is tripped by a bracket 74 on the gripper platform 17 causing hydraulic cylinder 41 attached to the large travelling top platform 16 to transport a layer of concrete masonry blocks over the surface of the wide roller conveyor 10 until, at the end of the stroke of hydraulic cylinder 41, a limit switch (not shown) attached to the large travelling platform 16 is tripped by a fixed stop 75 on top of the channel rail 14. This is hydraulic cylinder 38 to open grippers 18 and deposit the layer of concrete masonry blocks on to the wide conveyor 10. The blocks are then carried forward by the wide conveyor 10 under the small gripper platform 21 with the gripper 22 open and front flap or bar 57 down, (see FIG. 1) preventing any further forward motion of concrete masonry blocks, allowing only two blocks to be positioned under the small gripper platform 21.

When the concrete masonry blocks being transported by the narrow conveyor 11 pass the end of a pivoted trip rod 76 bearing against the side of the moving blocks, a tailpiece 78 on said rod 76 trips a limit switch 79 which causes a hydraulic cylinder 45 to close the pivoted moveable gripper 22 and hold blocks 24 between the pivoted moveable gripper 22 and fixed jaw 23.

When gripping pressure builds up to a predetermined limit a pressure switch (not shown) actuates a limit switch (not shown) mounted on framework of small travelling top platform 20 which causes a hydraulic cylinder 42 to move gripped blocks directly over narrow conveyor 11 and at the end of its stroke a limit switch (not shown) on the small travelling platform 20 is tripped by a fixed stop 80 on the end of channel rail 14 causing hydraulic cylinder 45 to function and open the gripper clamp and deposit the concrete masonry blocks on to the narrow conveyor 11, the remaining blocks on the large conveyor 10 being held back by front guard flap 51.

When the pivoted gripper 22 opens a limit switch (not shown) it is tripped by lug 81 on the gripper side causing a hydraulic cylinder 42 to return the small travelling top platform 20 with the lower gripper platform 21 to a block receiving position, at the same time, lifting front guard flap 51 and lowering stop bar 57.

To ensure that only two rows of concrete masonry blocks are in position under the small gripper head 21, two limit switches 82 on the fixed jaw side attached to the conveyor frame (see FIG. 7) must have their actuating rollers 83 contacting the edges of both concrete masonry blocks to close electrical circuit before gripper 22 can close.

When all the concrete masonry blocks have passed the rubber tyred wheel 60 on the end of pivoted counterweighted lever 61, the wheel 60 is lowered against stop bar 84 and lever arm closes a limit switch 62 causing the hydraulic cylinder 41 to return the large travelling top platform 16 to a position with the front of the conveyor directly above a stack of concrete masonry blocks on pallet 63.

After the last layer of concrete masonry blocks have been lifted from the stack and deposited on to the wide conveyor 10 the roller 64 attached to the parallel links 65 at the base of the machine, is free to move forward and a tailpiece 85 on the parallel links trips a limit switch 66 and opens an electrical circuit which stops the machine until another stack of concrete masonry blocks are moved into position against roller 64.

A guide finger 86 with roller 87, attached to the side of the conveyor 17 (see FIG. 7) counteracts any tendering for the edges of the concrete masonry blocks to wander, when being conveyed under the fixed jaw 23 on the small gripper platform 21.

Both the wide and narrow conveyors have independent geared head electric motor drives 88 operated by manual controlled "on" and "off" switches.

An electric motor driven pump and sump unit 89 mounted on a stand adjacent to the machine supplies oil under pressure through flexible pipe lines (not shown) for operating the various hydraulic cylinders.

We claim:

1. A machine for automatically handling a layer of stacked rows of articles comprising a frame supporting a conveyor assembly having a first conveyor with front loading and rear delivery positions and a second conveyor at the delivery end of the first conveyor in the same horizontal plane, a carriageway above the first conveyor extending forwardly thereof out over a loading zone and rearwardly across the width of the second conveyor, a first vertically reciprocating clamp assembly on a platform suspended from a first trolley reciprocating horizontally along the carriageway between forward loading and rearward unloading positions, a second vertically reciprocating clamp assembly mounted on a travelling platform suspended from a second trolley smaller than the first trolley and reciprocating horizontally along the carriageway between a loading position at the rear of the first conveyor and an unloading position out over the second conveyor, the width of the second trolley along the carriageway being substantially equal to a double row of said articles and the return movement of said trolley being synchronized with that of a double gate mechanism operating at the rear or delivery end of the first conveyor for transferring batches of double rows of said articles from said first conveyor to said second conveyor.

2. A machine according to claim 1, wherein a free riding rotating member is pivotally mounted on the frame adjacent the first conveyor and is adapted to ride in frictional contact with the upper surface of units moving along the first conveyor and remote from the front or loading end of the first conveyor, the free riding member being adapted to drop down from the upper surface of the units onto the upper surface of the first conveyor to actuate a cut off device on the conveyor to intermittently stop movement of the conveyor and to actuate return movement of the front trolley back to the front or loading end of the first conveyor and forwardly out over the stack of units to be lowered down onto the stack to lower the clamp members from the platform onto or alongside the topmost row of units in the stack.

3. A machine according to claim 1 wherein the clamp assembly of the first trolley platform comprises a fixed gripping jaw and an opposed moving jaw actuated by a hydraulic or pneumatic ram assembly and wherein the moving jaw member is provided with pressure sensing means adapted to increase the pressure on a top layer of units of a stack to a predetermined level and then to trip a switch device actuating the pulley assembly elevating the gripping platform together with its load onto a loading position on the first conveyor.

4. A machine according to claim 3 wherein the frame or housing is provided with means adjacent the sides of the first conveyor supporting a rotatable shaft member extending transversely across the conveyor supporting a gate member of the double gate mechanism for units travelling along the conveyor and actuated by a rotating member on one end of a bell crank lever contacting cam means fixed to the platform of the rear trolley, the other end of the bell crank lever having tension means attached to a fixed support and wherein the gate member functions as a stop to prevent movement of the units along the conveyor until the rear trolley returns to the rear delivery position of the first conveyor after discharging two rows of units onto the second conveyor, the cam means actuating said roller on the bell crank lever thereby elevating the gate member.

* * * * *